US005116669A

United States Patent [19]

Sonobe

[11] Patent Number: 5,116,669

[45] Date of Patent: May 26, 1992

[54] COMPRESSIBLE RUBBER BLANKET FOR OFFSET PRINTING

[75] Inventor: Saburo Sonobe, Toride, Japan

[73] Assignee: Kinyosha Co., Ltd., Tokyo, Japan

[21] Appl. No.: 700,172

[22] Filed: May 13, 1991

[51] Int. Cl.[5] .................................... B32B 7/00

[52] U.S. Cl. .................................... 428/250; 428/246; 428/249; 428/252; 428/280; 428/282; 428/304.4; 428/909

[58] Field of Search ............... 428/246, 249, 250, 252, 428/909, 280, 282, 304.4

[56] References Cited

U.S. PATENT DOCUMENTS

| | | | |
|---|---|---|---|
| 2,076,376 | 4/1937 | Lewis et al. | 428/909 |
| 3,418,864 | 12/1968 | Ross | 428/909 |
| 3,795,568 | 3/1974 | Rhodarmer et al. | 428/909 |
| 4,042,743 | 8/1977 | Larson | 428/909 |
| 4,471,011 | 9/1984 | Spöung | 428/909 |
| 4,981,750 | 1/1991 | Murphy et al. | 428/909 |
| 5,066,537 | 11/1991 | O'Rell et al. | 428/909 |

*Primary Examiner*—James J. Bell
*Attorney, Agent, or Firm*—Nixon & Vanderhye

[57] ABSTRACT

The compressible rubber blanket for offset printing of the present invention is characterized by making the thickness of the solid rubber layer 0.25 mm or greater and setting the ratio of the thicknesses of the surface rubber layer, compressible layer and solid rubber layer to predetermined one, whereby it is enabled to be excellent in printability, to make reduction in the thickness during printing less, to be excellent in the action of absorbing a shock such as a mechanical impact, and to prevent the material to be printed from winding around the blanket cylinder. And, the blanket applies to printing machines such as sheet-fed offset presses, offset rotary presses and perfecting presses, and it is suitable for printing of coated papers, carton boards and the like.

5 Claims, 2 Drawing Sheets

COMPRESSIBLE RUBBER BLANKET FOR OFFSET PRINTING

FIELD OF THE INVENTION

The present invention is related to a compressible rubber blanket for offset printing.

BACKGROUND OF THE INVENTION

The compressible rubber blanket for offset printing is used to receive ink from a plate and transfer it to an object to be printed such as paper. FIG. 4 is a cross-sectional view showing the structure of the main parts of the conventional compressible rubber blanket for offset printing. In the figure, 1 is a surface rubber layer which received and transfers ink. Surface rubber layer 1 is laminated on reinforcing layer 2 sequentially through compressible layer 3 and woven cloth 4. In reinforcing layer 2, three woven cloths 2*a* are integrally laminated with solid rubber layers 2*b* which are interposed between each woven cloth 2*a*. Compressible layer 3 is to absorb shock such as mechanical impact and to improve the reproducibility of a plate. Compressible layer 3 is formed of porous rubber for instance. Woven cloths 2*a* and 4 are formed of cotton cloth or synthetic fiber.

The compressible rubber blanket for offset printing constructed in this way is mounted on a metallic blanket cylinder when it is used, with a constant tension being applied thereto. Accordingly, a process for preventing the elongation due to the tension is applied to maintain a predetermined strength. To fully exhibit the action for preventing the elongation due to the tension, usually a tensile strength of 65 Kgf/cm is required.

On the other hand, the thickness of one blanket is typically about 1.9 mm. In addition, the total number of woven cloths 2*a* and 4 for reinforcement is often 4 or larger.

In FIG. 4, four woven cloths 2*a* and 4 are used for the traditional compressible rubber blanket for offset printing, and the thickness of the whole blanket is about 1.9 mm. Compressible layer 3 is a base for designing a compressible rubber blanket for offset printing, and in this case that having a thickness of 0.25 to 0.4 mm is considered to be the best. The material and thickness of compressible layer 3 is determined in consideration of the reproducibility of images of the plate, the running characteristics of forms in the offset rotary press, and absorption of shock such as mechanical impact.

It is said that surface rubber layer 1 performing the transfer of ink requires a thickness of 0.25 mm or greater at the minimum. If surface rubber layer 1 is too thin, the texture of the uppermost woven cloth 4 appears on the printed matter, causing printing failure. In order to prevent this phenomenon, usually a comparatively thin woven cloth 4 having a thickness of about 0.2 mm is used. As the lower woven cloths 2*a*, rather thick ones of the order of 0.3 to 0.4 mm are used to fully exhibit strength. For such limitations on surface layer, etc., the thickness of solid rubber layer 2*b* of the conventional compressible rubber blanket for offset printing naturally becomes thin, usually in the order of 0.05 mm. And, solid rubber layer 2*b* is dedicated to the role of bonding woven cloths 2*a* with each other.

Incidentally, the thickness of each layer of the typical conventional compressible rubber blanket for offset printing is as follows for instance.

| | |
|---|---|
| Surface layer 1 | 0.25 mm |
| Woven cloth 4 | 0.21 mm |
| Compressible layer 3 | 0.25 mm |
| Woven cloth 2a | 0.4 mm |
| Solid rubber layer 2b | 0.05 mm |
| Woven cloth 2a | 0.3 mm |
| Solid rubber layer 2b | 0.05 mm |
| Woven cloth 2a | 0.4 mm |
| Total thickness | 1.91 mm |

For this compressible rubber blanket for offset printing, the total thickness of the solid rubber layer is 0.1 mm, and it has the following drawbacks.

1) Since solid rubber layer 2*b* is thin, the action of absorbing a shock such as a mechanical impact is insufficient, and particularly in old printing machines or high-speed printing machines, stripes called shock marks appear on the printed matter.

2) Woven cloth 2*a* such as cotton cloth is crushed when applied with a pressure and causes a permanent deformation, whereby the thickness of the blanket is reduced during printing (this is called sinking). As a result, the pressure during printing decreases and the transfer of ink also decreases, and thus a required ink density cannot be obtained on the printed matter. Such condition occurs, the printing machine should be stopped and a packing should be added under the blanket to compensate the reduced thickness. For this, the operating efficiency of the printing machine is reduced.

3) When a paper break trouble occurs during printing, folded papers are pressed against the blanket surface, which locally receives a large deformation. Whereupon, this portion causes a permanent distortion and becomes uneven, and thus printing is unabled.

In the usual printing, it is compressible layer having a large elastic recovery ability which is applied with the printing pressure and deforms, but at the time of smashing (instantaneous large deformation), it cannot be treated only by the deformation of the compressible layer and the strong pressure reaches even to the woven cloth, resulting in the crush of the woven cloth to cause a permanent distortion. As a result, printing is unabled.

4) If a printing material of a wide paper width is printed after a large number of printing materials of a narrow paper width have been printed, a sinking occurs in the portion corresponding to that of the narrow paper wide, and the ink density becomes low. Particularly, a linear shading occurs in the end portion of the paper width, causing print failure.

As a result of our various studies, it was found that woven cloths 2*a* and 4 cause a shock such as a mechanical impact, sinking and the occurrence of impressions due to paper break or the like, which result in such defects. It was also found that, in the conventional compressible rubber blanket for offset printing shown in FIG. 4, a shock such as a mechanical impact cannot fully be absorbed since solid rubber layers 2*b* between woven cloths 2*a* are thin.

In addition, the lowermost one among the woven cloths 2*a* is experiences particularly large permanent deformation because it is used in directly contact with the metallic cylinder. In contrast to this, woven cloth 2*a* nearer to compressible layer 3 has less degree of the permanent deformation.

SUMMARY OF THE INVENTION

The present invention is to provide a compressible rubber blanket which is excellent in printability, results less decrease in the thickness during printing, has an excellent action of absorbing a shock due to a mechanical impact or the like, and can prevent an object to be printed from winding around the blanket cylinder.

As a result of various studies, the present inventors found that, in order to enhance the action of absorbing a shock due to a mechanical impact or the like, prevent a paper mark accompanying the change of the printing paper width from remaining, and prohibit the occurrence of impressions due to paper break or the like, it is desirable to decrease the number of the woven cloths as much as possible and make the solid rubber layers between the woven as thick as possible. Further, it was found that it is desirable to make the thickness of the solid rubber layers 0.25 mm or greater to exhibit the bonding action and shock absorbing action between the woven cloths.

That is, the present invention is a compressible rubber blanket for offset printing comprising woven cloths laminated on both surface and rear sides of solid rubber layers having a thickness of 0.25 mm or greater, and a surface rubber layer integrally laminated on one said woven cloth sequentially through a compressible layer and a woven layer. It is preferable to set the solid rubber layers to any one of 1:1:1, 1:1:2 or 2:1:1.

In addition, the hardness of the solid rubber layers is preferably set within the range of 50 to 85 of the JIS A standard.

The thickness of the compressible layer is preferably set to 0.25 mm or greater.

The thickness of the three woven cloths are preferably set to 0.21 mm, 0.40 mm and 0.30 mm, respectively, from the surface rubber layer side to the solid rubber layer side.

In the compressible rubber blanket for offset printing of the present invention, mainly the compressible layer having a large elastic recovery is subjected to a deformation during the normal printing and the solid rubber layers having a large elastic recovery undergo a deformation when a smash accident occurs, and thus the crush of the woven cloth is prevented to cause no permanent distortion of the woven cloths.

MOST PREFERRED MODE FOR EMBODYING THE INVENTION

Embodiment 1

Figure 1:
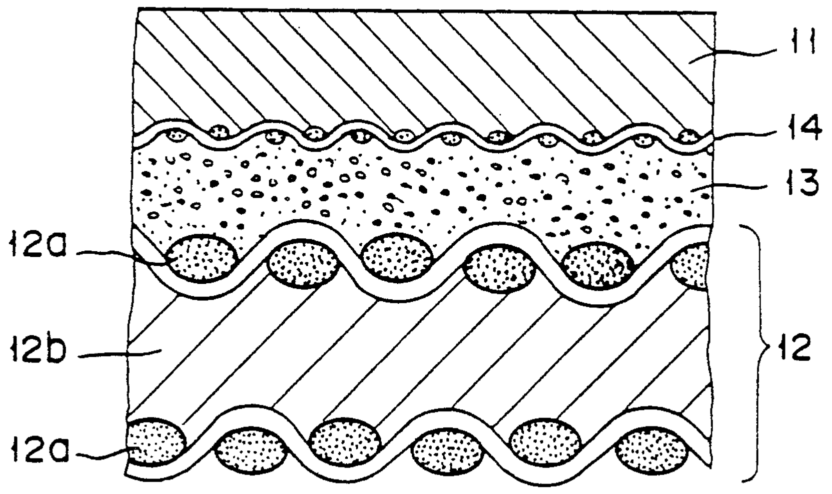
FIG. 1 is a cross-sectional view showing the structure of the main parts of the compressible rubber blanket for offset printing of an embodiment of the present invention.

FIG. 1 is a cross-sectional view showing the structure of the main parts of the compressible rubber blanket for offset printing of an embodiment of the present invention.

In the figure, 11 represents a surface rubber layer performing the receiving and transfer of ink. Surface rubber layer 11 is laminated on reinforcing layer 12 sequentially through compressible layer 13 and woven cloth 14. The thickness of surface rubber layer 11 is set to about 0.33 mm. The thickness of woven cloth 14 is set to about 0.21 mm. By this woven cloth 14, texture is prevented from appearing during printing.

In reinforcing layer, two woven cloths **12*a* have solid rubber layer 12*b*** interposed therebetween and are integrally laminated therewith.

Woven cloths **12*a* and 14** are formed of, for instance, cotton cloths, synthetic fibers and plastic films.

The thickness of solid rubber layer **12*b* is set to around 0.33 mm. The thickness of solid rubber layer 12*b* needs to be set to 0.25 mm or larger, and if the thickness of solid rubber layer 12*b* is less than 0.25 mm, the shock resistance during printing cannot fully be increased and the settling due to the permanent deformation of woven cloths 12*a* and 14 cannot be prevented. In addition, the hardness of solid rubber layer 12*b* is set within the range of 50 to 85 of the JIS· A standard. If it is less than 50, the print pressure decreases to cause the evenness of the ink film to be lost and provide insufficient ink density during printing, producing a so-called solid coverage failure. Also, if it exceeds 85, the shock resistance decreases. Of the two woven cloths 12*a* sandwiching solid rubber layer 12*b*, the thickness of the lower one is set to 0.30 mm and that of the upper one near to surface rubber layer 11 is set to 0.40 mm. A sufficient tensile strength is insured by these woven cloths 12*a* and solid rubber layer 12*b***.

Compressible layer 13 is to absorb the shock such as the mechanical impact which the compressible rubber blanket for offset printing receives, and to improve the reproducibility of the plate. The thickness of compressible layer 13 is set to about 0.33 mm. The thickness of compressible layer 13 needs to be set to 0.25 mm or larger. Compressible layer 13 is formed of porous rubber for instance.

It is experimentally confirmed that the compressible rubber blanket for offset printing constructed in this way can assure a tensile strength of 70 Kgf/cm. In this compressible rubber blanket for offset printing, the thickness ratio of surface rubber layer 11, compressible layer 13 and solid rubber layer **12*b* is set to 1:1:1. Accordingly, it applies to printing machines such as sheet-fed offset presses, perfecting presses and offset rotary presses, and it is suitable for the printing of coated paper, art paper, uncoated paper, carton board, plastic film and metal plate. The compressible rubber blanket for offset printing of the embodiment 1** having the total thickness of 1.90 mm was combined with a 0.1 mm-thick packing and this was wound around the metallic cylinder of a sheet-fed offset press, and the following print test was performed.

The print pressure between the plate and blanket was 0.12 mm. First, a test paper was passed through a printing machine, the test paper consisting of a 0.1 mm-thick printing paper (coated paper) having a 0.4 mm-thick paper partially laminated thereon to partially produce an over-pressure state, and thereafter printing was performed on a normal coated paper having a thickness of 0.1 mm. It was examined when impressions disappeared as a result, and the impressions completely disappeared on the fifth piece and a desired printed matter was obtained.

Figure 4:
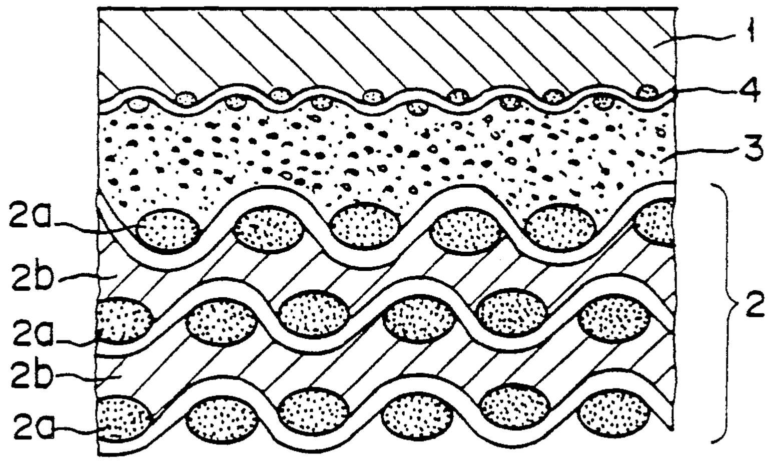
FIG. 4 is a cross-sectional view showing the structure of the main parts of the conventional compressible rubber blanket for offset printing.

In contrast to this, when a similar test was made using the conventional compressible rubber blanket for offset printing shown in FIG. 4, it was affirmed that impressions still appeared on the printed matter even after the printing of 150th piece.

EMBODIMENT 2

Figure 2:
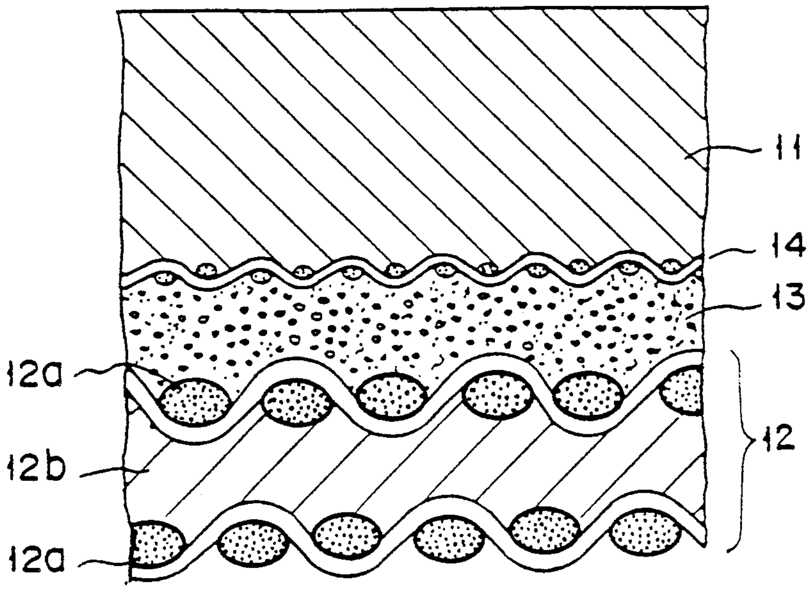
FIG. 2 is a cross-sectional view showing the structure of the main parts of the compressible rubber blanket for offset printing of a further embodiment of the present invention.

FIG. 2 is a cross-sectional view showing the structure of the main parts of the compressible rubber blanket of a further embodiment of the present invention.

In the figure, surface rubber layer 11 is laminated on reinforcing layer 12 sequentially through compressible layer 13 and woven cloth 14. The thickness of surface rubber layer 11 is set to about 0.50 mm. The thickness of woven cloth 14 is set to about 0.21 mm.

In reinforcing layer 12, two woven cloths **12*a* have solid rubber layer 12*b*** interposed therebetween and are integrally laminated therewith.

Woven cloths **12*a* and 14** are formed of, for instance, cotton cloths, synthetic fibers and plastic films.

The thickness of solid rubber layer **12*b* is set to about 0.25 mm. The thickness of solid rubber layer 12*b* needs to be set to 0.25 mm or larger. Also, the hardness of solid rubber layer 12*b*** is set within the range of 50 to 85 of the JIS· A standard.

Of the two woven cloths **12*a* sandwiching solid rubber layer 12*b*, the thickness of the lower one is set to 0.30 mm and the thickness of the upper one near to surface rubber layer 11 is set to 0.40 mm. A sufficient tensile strength is assured by these woven cloths 12*a* and solid rubber layer 12*b***.

Compressible layer 13 is to absorb the shock such as the mechanical impact which the compressible rubber blanket for offset printing receives, and to improve the reproducibility of the plate. The thickness of compressible layer 13 is set to about 0.25 mm. The thickness of compressible layer 13 needs to be set to 25 mm or larger. Compressible layer 13 is formed of porous rubber for instance.

It is experimentally assured that the compressible rubber blanket for offset printing constructed in this way can insure a tensile strength of 70 Kgf/cm. compressible rubber blanket for offset printing, the ratio of the thicknesses of surface rubber layer 11, compression layer 13 and solid rubber blanket **12*b* is set to 2:1:1. Thus, the slip amount of surface rubber layer 11 at the contact rotation with the plate and impression cylinder increases as surface rubber layer 11** becomes thick. As a result, the imprinting effect of ink to a material to be printed, and the solid coverage becomes good in the surface uncoated paper, which is advantageous for printing newspapers.

The compressible rubber blanket for offset printing of the embodiment 2 having the whole thickness of 1.91 mm was combined with a 0.1 mm-thick packing and this was wound around the metallic blanket cylinder of a newspaper offset rotary press, and the following print test was performed.

The print force between the plate and blanket was set to 0.15 mm, printing was made 5 million times at a speed of 450 revolutions per minute, and the amount of change in the sinking was determined with a blanket cylinder gauge.

When the compressible rubber blanket for offset printing of the embodiment 2 was used, the sinking was −0.04 mm. In addition, the solid density measured by a gretag densitometer D142-3 was 1.1 at the initial stage of printing and 1.05 after the printing of 5 million times. That is, it was confirmed that the sinking of the blanket was less and the capability of maintaining the print quality was high.

In contrast to this, when a similar print test was made using the conventional compressible rubber blanket for offset printing shown in FIG. 4, the sinking was −0.09 mm, and the solid density measured with a gretag densitometer D142-3 was 1.1 at the initial stage of printing and 0.95 after the printing of 5 million times. Namely, it was confirmed that the sinking of the blanket was large and the capability of maintaining the printing quality was low.

EMBODIMENT 3

Figure 3:
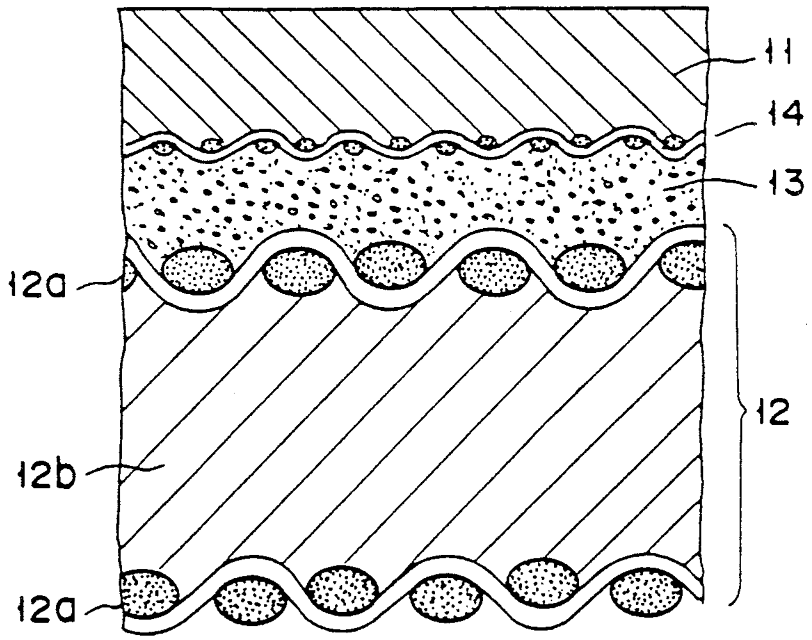
FIG. 3 is a cross-sectional view showing the structure of the main parts of the compressible rubber blanket for offset printing of a further embodiment of the present invention.

FIG. 3 is a cross-sectional view showing the structure of the main parts of the compressible rubber blanket for offset printing of a further embodiment of the present invention.

In the figure, 11 is a surface rubber layer. Surface rubber layer 11 is laminated on reinforcing layer 12 sequentially through compressible layer 13 and woven cloth 14. The thickness of surface rubber layer 11 is set to about 0.25 mm. The thickness of woven cloth 14 is set to about 0.21 mm.

In reinforcing layer 12, two woven cloths **12*a* have solid rubber layer 12*b*** interposed therebetween and are integrally laminated therewith.

Woven cloths **12*a* and 14** are formed of, for instance, cotton cloths, synthetic fibers and plastic films.

The thickness of solid rubber layer **12*b* is set to about 0.50 mm. The thickness of solid rubber layer 12*b* needs to be set to 0.25 mm or larger. In addition, the hardness of solid rubber layer 12*b*** is set within the range of 50 to 85 of the JIS· A standard.

Of the two woven cloths **12*a* sandwiching solid rubber layer 12*b*, the thickness of the lower one is set to 0.30 mm and the thickness of the upper one near to surface rubber layer 11 is set to 0.40 mm. A sufficient tensile strength is assured by these woven cloths 12*a* and solid rubber layer 12*b***.

Compressible layer 13 is to absorb the shock such as the mechanical impact the compressible rubber blanket for offset printing receives, and to improve the reproducibility of the plate. The thickness of compressible layer 13 is set to about 0.25 mm. The thickness of compressible layer 13 needs to be set to 0.25 mm or greater. Compressible layer 13 is formed of porous rubber for instance.

It is experimentally assured that the compressible rubber blanket for offset printing constructed in this way can insure a tensile strength of 70 Kgf/cm. In the compressible rubber blanket for offset printing, the ratio of the thicknesses of surface rubber layer 11, compression layer 13 and solid rubber layer **12*b* is set to 1:1:2. That is, solid rubber layer 12*b* is made thick-walled as compared with those of the embodiments 1 and 2. And, if solid rubber layer 12*b*** becomes thick, it can withstand a large printing pressure. The compressible rubber blanket is suitable for printing data on thick paper such as cardboard, or on a metal sheet, and is compressed to have its thickness reduced by 0.25 to 0.35 mm in order to print data on the thick paper or the metal sheet. (When the blanket is used to print data on art paper, it is compressed to have its thickness decreased by 0.1 to 0.15 mm).

The printing of a card having a thickness of 0.45 mm was performed using the compressible rubber blanket for offset printing of the embodiment 3 having the whole thickness of 1.91 mm. First, printing was performed on 100 thousands card having a paper width of 600 mm, and then printing was made on card having a paper width of 900 mm. As a result, printing could be made extremely well.

In contrast to this, a similar print test was made using the compressible rubber blanket for offset printing shown in FIG. 4. In this case, a paper impression of a paper width of 600 mm occurred for the printing of card having a paper width of 900 mm and caused unevenness of the ink density, producing defective printing. The blanket needed to be and was, replaced by a new one.

INDUSTRIAL APPLICABILITY

The compressible rubber blanket for offset printing of the present invention applies to printing machines such as sheet-fed offset press, perfecting press and offset rotary presses, and it is suitable for printing of coated papers, art papers, uncoated papers, carton papers, plastic films and metal plates.

I claim:

1. A compressible rubber blanket for offset printing comprising woven cloths laminated on both surface and rear sides of a solid rubber layer having a thickness of 0.25 mm or greater, and a surface rubber layer integrally laminated on one said woven cloth sequentially through a compressible layer and a woven cloth.

2. A compressible rubber blanket for offset printing as set forth in claim 1 wherein the ratio of the thicknesses of the surface rubber layer, compression layer and solid rubber layer is any one of 1:1:1, 1:1:2 or 2:1:1.

3. A compressible rubber blanket for offset printing as set forth in claim 1 wherein the hardness of the solid rubber layer is within the range of 50 to 85 of the JIS· A standard.

4. A compressible rubber blanket for offset printing as set forth in claim 1 wherein the thickness of the compressible layer is 0.25 mm or greater.

5. A compressible rubber blanket for offset printing as set forth in claim 1 wherein the thicknesses of the three woven cloths are 0.21 mm, 0.40 mm and 0.30 mm, respectively, from the surface rubber layer side toward the solid rubber layer side.

* * * * *